United States Patent
Takahashi et al.

(10) Patent No.: US 6,645,440 B1
(45) Date of Patent: Nov. 11, 2003

(54) THERMAL DECOMPOSITION FURNACE FOR EXHAUST GAS

(75) Inventors: Hiroyuki Takahashi, Tokyo (JP); Kiyoe Takahashi, Tokyo (JP)

(73) Assignee: Kyowa Co., Ltd., Tokyo (JP)

( * ) Notice: Subject to any disclaimer, the term of this patent is extended or adjusted under 35 U.S.C. 154(b) by 0 days.

(21) Appl. No.: 09/673,860

(22) PCT Filed: Sep. 2, 1999

(86) PCT No.: PCT/JP99/04762
§ 371 (c)(1),
(2), (4) Date: Oct. 18, 2000

(87) PCT Pub. No.: WO00/13769
PCT Pub. Date: Mar. 16, 2000

(30) Foreign Application Priority Data

Sep. 3, 1998 (JP) .......................... 10-287194
Sep. 4, 1998 (JP) .......................... 10-288609

(51) Int. Cl.⁷ .................................... B01J 19/08
(52) U.S. Cl. ........................................ 422/186.04
(58) Field of Search ................................. 422/186.04

(56) References Cited

U.S. PATENT DOCUMENTS

| 4,954,320 A | * | 9/1990 | Birmingham et al. | .. 422/186.04 |
|---|---|---|---|---|
| 5,236,672 A | | 8/1993 | Nunez et al. | .......... 422/186.04 |
| 5,764,850 A | | 6/1998 | Olstad et al. | ................ 392/485 |

FOREIGN PATENT DOCUMENTS

| JP | 7-12321 | 1/1995 |
|---|---|---|
| JP | 7-256056 | 10/1995 |
| JP | 8-243344 | 9/1996 |
| JP | 10036851 | 10/1998 |
| JP | 11-82980 | 3/1999 |
| JP | 11-101426 | 4/1999 |

* cited by examiner

*Primary Examiner*—Kishor Mayekar
(74) *Attorney, Agent, or Firm*—Young & Basile, P.C.

(57) ABSTRACT

A thermal decomposition furnace for exhaust gas to thermally decompose harmful substances contained in the exhaust gas to render them harmless. The thermal decomposition furnace includes a heating chamber for heating the exhaust gas; an inlet port for introducing the exhaust gas into the heating chamber; at least one pair of electrodes provided within the heating chamber; a plurality of light emitting heaters which contain carbon as a main ingredient; and an outlet port for discharging the thermally decomposed exhaust gas. The plurality of light emitting heaters are placed in an oxygenless or a vacuum environment.

10 Claims, 12 Drawing Sheets

THERMAL DECOMPOSITION FURNACE FOR EXHAUST GAS

This application is a 35 U.S.C. 371 National Stage filing a PCT/JP99/04762 filed Sep. 2, 1999.

BACKGROUND OF THE INVENTION

The present invention relates generally to thermal decomposition furnaces for heating to high temperatures exhaust gases produced when general wastes such as resin and paper, industrial and medical wastes and crude oils, waste oils and petrochemical substances are burnt to thermally decompose harmful substances contained within the exhaust gases to render the substances harmless.

In waste processing facilities and factories, large amounts of various kinds of wastes/crude oils, waste oils and petrochemical substances are incinerated. Exhaust gases and smoke produced at that time contain harmful substances such as soot, dust, carbon monoxide, chlorine compounds such as hydrogen chloride, nitrogen compounds such as $NO_x$, and dioxin, which affect adversely the environment and human bodies. Thus, the harmful substances in the exhaust gas and smoke are controlled. Especially, substances such as dioxin, which has a very high toxicity and adversely affects human bodies for a long time.

In general waste processing facilities and factories use incinerators of the type which feed air to wastes and petrochemical substances and burns them. These types of incinerators are called natural incinerators. Natural incinerators bum wastes at low temperatures, for example, at 300–500° C., and cannot absolutely avoid production of dioxin.

In order to conform to control of dioxin discharge, the following measures are available:

(1) Wastes which produce no dioxin are segregated from those which produce dioxin, and only the wastes which produce no dioxin are burned;

(2) A device is used for removing or decomposing dioxin contained in exhaust gases discharged from an incinerator and is attached to the incinerator; or (3) Incinerators are used which burn wastes at high temperatures (of about 800° C.), where dioxin is difficult to produce.

However, there is the problem with the first method in that a great deal of time and a considerable cost are required for segregating the wastes. Complete segregation is substantially impossible and production of a small amount of dioxin cannot be avoided.

The second method is not satisfactory to cope with dioxin because there are no inexpensive devices for the complete removal or decomposition of dioxin.

The exhaust gases contain a plurality of harmful substances. In order to remove or decompose all of them, a plurality of devices is required to remove or decompose the harmful substances. Thus, there are the problems associated with the cost increases and complicated by the structure of the incinerator.

The third method provides for an incinerator which burns wastes at high temperatures and is expensive. This method has the problem in that the conventional incinerator must be replaced and a new incinerator which bums the wastes at the high temperatures installed.

Thus it is an object of the present invention to provide an inexpensive thermal decomposition apparatus which solves the abovementioned problems, and to provide an inexpensive thermal decomposition furnace for an exhaust gas attached to equipment/facilities such as an incinerator which discharges exhaust gases and smoke which contain harmful substances for thermally decomposing the harmful substances to make them harmless.

SUMMARY OF THE INVENTION

In order to achieve the above object, the present invention has the following composition. The present invention is a thermal decomposition furnace for an exhaust gas which thermally decomposes harmful substances contained in the exhaust gas to render them harmless, and comprises a heating chamber for heating the exhaust gas, an inlet port for introducing the exhaust gas into the heating chamber, at least one pair of electrodes provided within the heating chamber, a plurality of light emitting heaters whose main element is carbon, the plurality of light emitting heaters being provided between the at least one pair of electrodes so as to produce an electric discharge upon application of voltage across the at least one pair of electrodes, and an outlet port for discharging the decomposed exhaust gases out of the heating chamber.

In the above arrangement, electric discharges occur between the light emitting heaters. The electric discharge region is at high temperatures, for example, of about 3000° C., so that a plurality of harmful substances such as carbon monoxide, chlorine compounds, nitrogen compounds and dioxin contained in the exhaust gas are simultaneously decomposed thermally at the high temperatures.

Exhaust gas thermal decomposition furnaces have a simple structure and can be made inexpensively. The furnace is the last furnace through which the exhaust gases pass from an existing or new incinerator. The harmful substances contained in the exhaust gases discharged from the incinerator are thermally decomposed and rendered harmless. Thus, even when the existing incinerator is of the type which produces a large amount of harmful substances, the furnace can be added without providing a new incinerator.

The light emitting heaters are preferably placed in an oxygenless environment. This prevents the oxidation of light emitting heaters and their deterioration thereby preventing a reduction in the discharging efficiency. Thus, the life of the light emitting heaters are extended. For example, when the plurality of light emitting heaters each take the form of a sphere, the discharging efficiency is very high. However, when the light emitting heater is oxidized, its deterioration and deformation reduce the discharging efficiency.

The oxygen concentration concerned is preferably low and there is no problem if it is not higher than the concentration of oxygen contained in air. When the oxygen concentration exceeds the concentration of oxygen contained in air, the plurality of light emitting heaters are liable to be oxidized and deteriorated.

Preferably, the plurality of light emitting heaters are placed in a vacuum. If it is placed in a clean environment such as the vacuum, the discharging efficiency is high and a corresponding high temperature is obtainable. Since a high temperature is obtained with little electric power, the operating cost of the decomposition furnace is low. In this case, as in the case in which the plurality of light emitting heaters are placed in the oxygenless state, they resist deterioration and have a long life.

A higher vacuum is preferred and a medium vacuum (of not less than $10^{-2}$ Pa and less than 10 Pa) suffices, but a lower vacuum (of not less than 10 Pa and less than the atmospheric pressure) is usable.

Furthermore, a fluid path extends between the inlet and outlet ports allowing the exhaust gas to pass through. The path may be provided within the heating chamber with the plurality of the light emitting heaters being provided within at least a part of the fluid path.

In such an arrangement, the exhaust gas comes into direct contact with the plurality of light emitting heaters. Thus, the exhaust gas is heated at high temperatures, for example, of about 3000° C. and almost all harmful substances are thermally decomposed.

A heat resistant pipe which places the inlet and outlet ports in fluid communication may be provided within the heating chamber with at least a part of the pipe encircled by the plurality of light emitting heaters.

In such an arrangement, the exhaust gas is heated within the heat resistant pipe and the exhaust gas does not come into contact with the light emitting heaters. Thus, corrosion and deterioration of the plurality of light emitting heaters by the exhaust gas does not occur.

Since the plurality of light emitting heaters are separated from the exhaust gas, they can be placed in an oxygenless or vacuum environment. Thus, the discharging efficiency is high and high temperature is easily obtained. High temperature is also obtained with a small electric power to thereby reduce the operating cost of the decomposition furnace. In addition, the plurality of light emitting heaters are not subject to deterioration and maintain a long life.

The heat resistant pipe may be made of a material which contains primarily carbon. In this case, since electric discharges occur also between the heat resistant pipe and the plurality of light emitting heaters which surround the heat resistant pipe, the heat resistant pipe is heated to a high temperature of about 3000° C. As a result, the exhaust gas is thermally decomposed more efficiently. Carbon pipes are preferably used as the heat resistant pipes, which preferably have electric conductivity enough to cause efficient electric discharge.

The plurality of light emitting heaters may be made of charcoal or graphite. As an example of charcoal, Japanese Bincho charcoal is used. Carbon materials such as charcoal and graphite have many pores in its surface for adsorbing gases within the pores. There is the problem with the release of the adsorbed gases at high temperatures. Thus, carbon materials such as charcoal and graphite are processed to prevent gas adsorption by closing the pores.

Preferably, the plurality of light emitting heaters are impermeable. In this case, since there is a reduced absorptivity, there is a reduction in the adsorption of harmful substances contained in the exhaust gas. Since the light emitting heaters suffer less deterioration by the harmful substances contained in the exhaust gas or by oxidation, they can maintain a long life. The impermeability of a material implies that its absorptivity is low because the number of pores present in a surface of the material is small and that its specific surface area is small, contributing to low oxidation or corrosion by chemicals.

The light emitting heaters preferably take the form of a sphere. In order to have efficient electric discharges between the plurality of light emitting heaters, the light emitting heaters are preferably in point contact, one with another. If they are in a line or surface contact state, a high current flows thereby reducing the discharge efficiency. When the plurality of light emitting heaters each take the form of a sphere, they are necessarily placed in a point contact state, efficient electric discharge is performed thereby providing a high temperature, and reducing the operating cost of the decomposition furnace. The light emitting heaters take the form of a perfect sphere more preferably.

The decomposition furnace may comprise a filter made of active carbon or charcoal, allowing the thermally decomposed exhaust gas to pass therethrough. In this case, even if the decomposed gases contain hydrocarbons, heavy metals or undecomposed harmful substances, the filter will adsorb them to prevent them from being discharged from the furnace.

BRIEF DESCRIPTION OF THE DRAWINGS

Other objects, features and advantages of the present invention will become apparent by reference to the following detailed description and drawings in which.

DETAILED DESCRIPTION OF THE PREFERRED EMBODIMENTS

Embodiments of the thermal decomposition furnace according to the present invention will be described in more detail with reference to the accompanying drawings. The terms indicating directions such as "up", "down", "front", "rear", "right" and "left" represent respective directions in each of the drawings for convenience of explanation.

It is to be noted that the present invention is not limited to the embodiments described below.

First Embodiment

Figure 1:
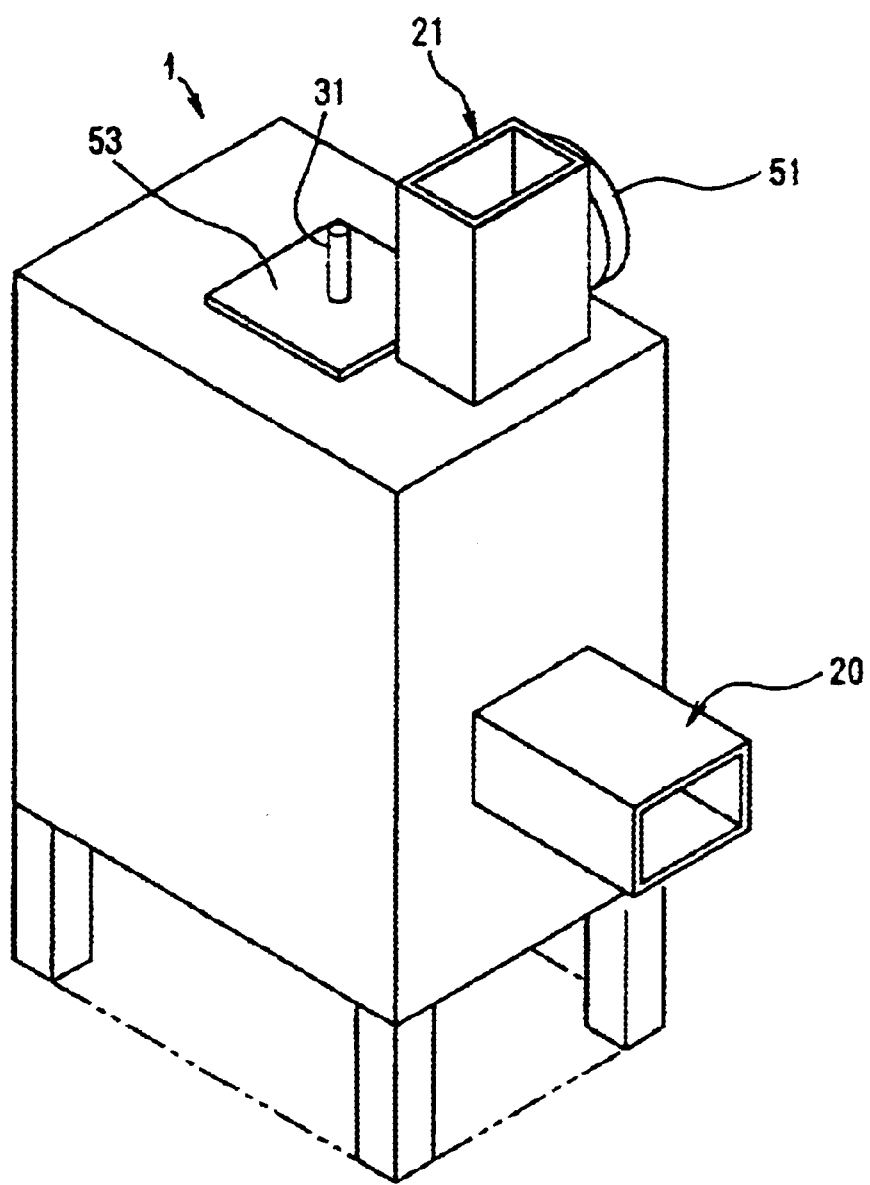
FIG. 1 is a perspective view of a first embodiment of a thermal composition furnace for exhaust gas according to the present invention.
Figure 2:
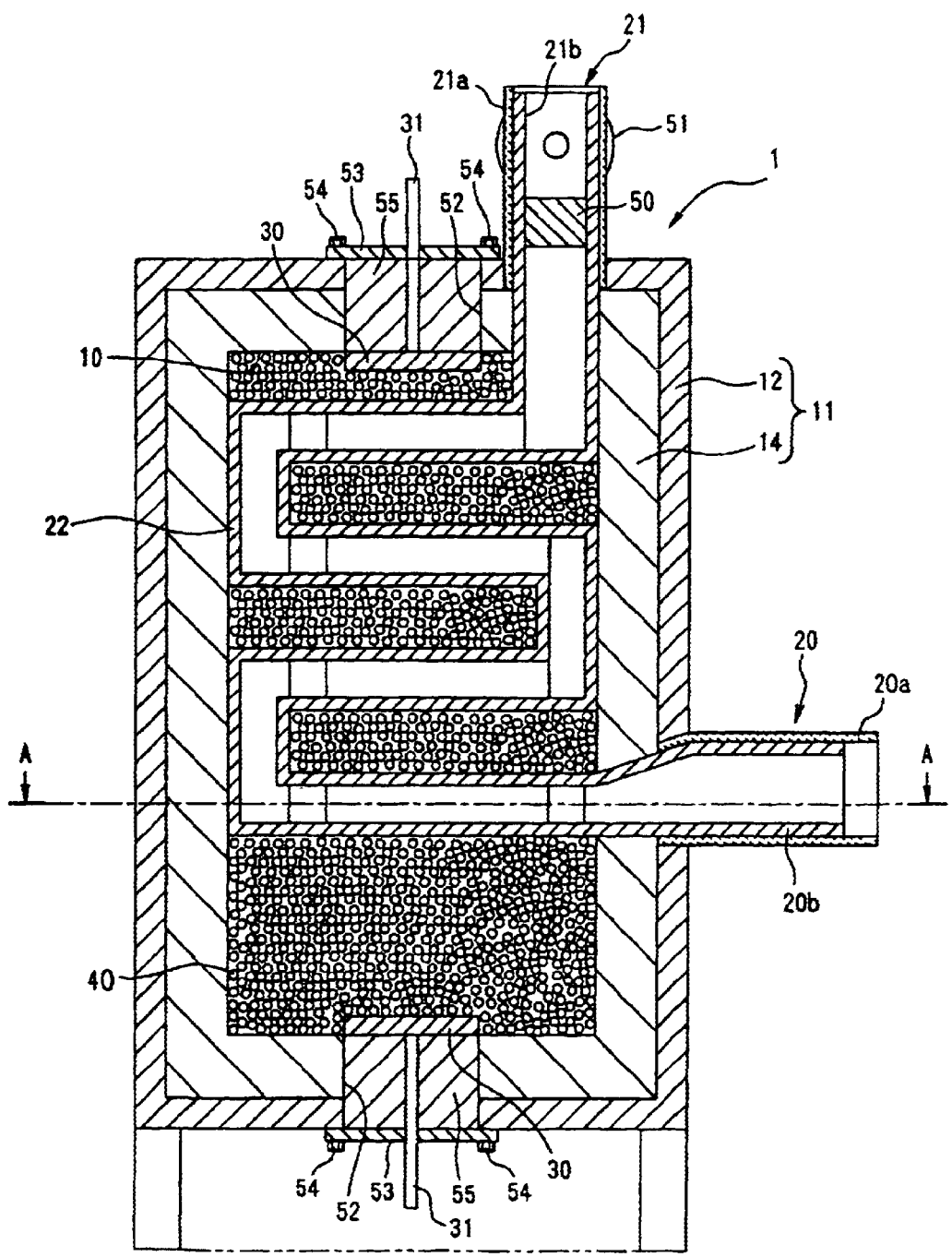
FIG. 2 is a vertical cross-sectional view of the first embodiment.
Figure 3:
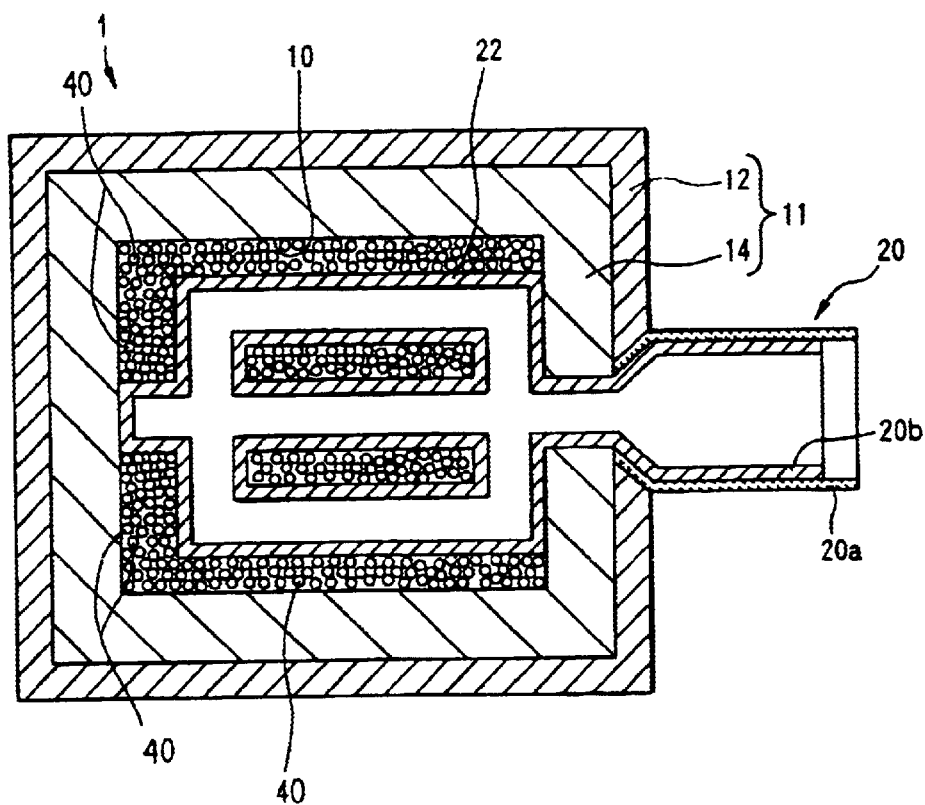
FIG. 3 is a horizontal cross-sectional view of the first embodiment.
Figure 4:
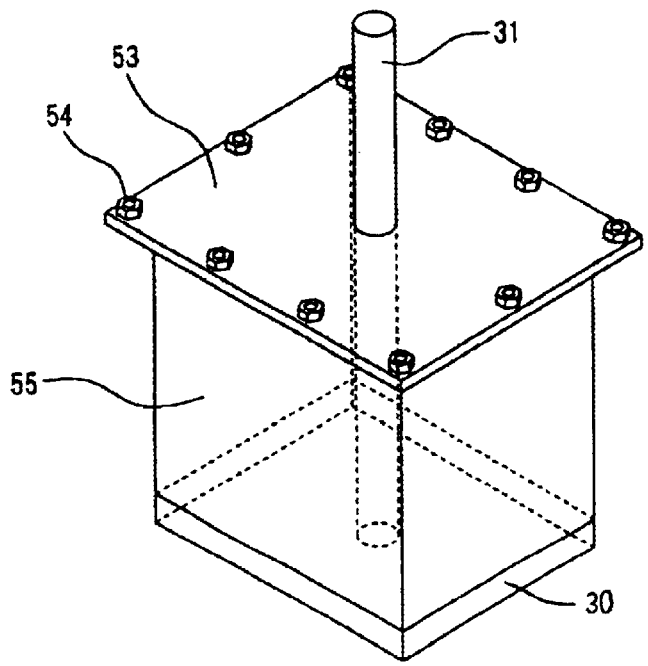
FIG. 4 is a partly enlarged view of the first embodiment.

FIG. 1 is a perspective view of a thermal decomposition furnace for exhaust gas in the first embodiment. FIG. 2 is a vertical cross-sectional view of the furnace 1. FIG. 3 is a horizontal cross-sectional view taken along a line A—A of FIG. 2. FIG. 4 is an enlarged view of an opening portion 52 of the furnace 1.

The furnace 1 includes an internal heating chamber 10 with an inlet port 20 on its side through which the exhaust gas is introduced into the heating chamber 10 and an outlet port 21 on its top through which the resulting decomposed exhaust gases are discharged from the heating chamber 10. The inlet port 20 has a double pipe structure which includes an outer ceramic pipe 20a and inner carbon pipe 20b. Similarly, the outlet port 21 has a double pipe structure which includes an outer ceramic pipe 21a and inner carbon pipe 21b.

The furnace 1 has an outer wall 11 of a double layer structure which includes an outer iron plate layer 12 coated with a heat resistant material and an inner heat resistant firebrick layer 14. As will be described later, the heating chamber 10 is heated to a temperature, for example, of about 3000° C., but is in an oxygenless environment or vacuum, so that heat conduction is minimized and hence a simple structure will suffice for the outer wall 11.

The inner rectangular parallelepiped space surrounded by the firebrick layer 14 forms the airtight heating chamber 10, where the exhaust gas introduced through the inlet port 20 is heated and thermally decomposed, and the resulting gases are discharged from the outlet port 21. Joints of the firebrick 14 layer are filled with a monolithic refractory such as refractory concrete (not shown) to thereby improve the airtightness of the heating chamber 10.

The heating chamber 10 has therein a heat resistant carbon pipe 22 extending between the inlet port 20 and the outlet port 21. The heat resistant pipe 22 may be made of a material such as alumina, resistant to temperatures of about 3000° C. Depending on the material used, the heat resistant pipe 22 may have a double structure to improve the heat resistance and strength thereof.

The heat resistant pipe 22 comprises a plurality of horizontal path and a plurality of vertical paths extending along the side of the heating chamber 10 which are combined alternately to form a zigzag vertical path. Each horizontal path separates into a plurality of subpaths (three in FIG. 3) which later merge into a single path. That is, the heat resistant pipe 22 extends while repeating separation, merging and zigzagging. The heating chamber 10 is filled with a plurality of light emitting heaters 40 each in the form of a graphite sphere (having a diameter of 30–50 mm) which encircle the heat resistant pipe 22, excluding the inside of the heat-resisting pipe 22. Since the plurality of light emitting heaters 40 each take the form of a sphere, adjacent ones of them are in point contact, one with another. They are also in point contact with the heat resistant pipe 22. The composition of the heaters 40 and a method of making them will be described in detail hereinbelow.

A pair of plate-like carbon electrodes 30 are each disposed on a respective upper and lower surfaces of the heating chamber 10 such that the plurality of light emitting heaters 40 are disposed between the pair of carbon electrodes 30 from which a corresponding pair of carbon rods 31 extends outwardly through the upper and lower outer walls 11 of the furnace 1. Each carbon rod 31 may be replaced with a heat resistant fireproof stainless steel one. It is to be noted that when the furnace 1 has a structure in which the pair of stainless steel rods extend through the corresponding pair of carbon electrodes 30 to come into contact with the plurality of light emitting heaters 40, the portions of the stainless steel rods in contact with the plurality of light emitting heaters 40 should be covered by a carbon material to prevent deterioration thereof.

A fiber-like active carbon filter 50 is provided between the heating chamber 10 and the outlet port 21. The active carbon filter is a porous matrix comprising micropores with diameters less than 20 Å, medium pores with diameters from 20 Å–1000 Å, and macropores having diameters greater than 1000 Å, and has a specific surface area of 500–1700 m²/g. Thus, the active carbon has strong absorptivity and can physically adsorb relatively large molecules. Instead of the fiber-like active carbon filter 50, particulate active carbon may be used.

A blower 51 is provided within the outlet port 21 to draw the exhaust gas from the inlet port 20 into the heating chamber 10. In an alternative, a vacuum pump may be used.

A pair of openings 52 each are provided through corresponding upper and lower surfaces of the furnace 1 for inspection/maintenance of the inside of the furnace 1 (including inspection and replacement of the light emitting heaters 40, carbon electrodes 30 and heat resistant firebrick layer 14). Each opening 52 is covered with an iron cover 53, which is removably fixed by bolts 54 to the outer wall 11. A refractory sealing sheet (not shown) is provided between each cover 53 and the outer iron plate layer 12 of the outer wall 11 to provide satisfactory airtightness of the furnace 1. A refractory concrete block 55 is placed between each carbon electrode 30 and a corresponding cover 53 to provide satisfactory maintenance of the temperature within the furnace 1. The refractory concrete block 55 may be replaced with a heat resistant firebrick.

A method for thermally decomposing harmful substances contained in the exhaust gas, using the furnace 1, will be described next.

The heating chamber 10 is in fluid communication with a vacuum pump (not shown) and hence placed in a vacuum state ($6.7 \times 10^{-2}$ Pa). Thus, the plurality of light emitting heaters 40 within the heating chamber 10 are also in the vacuum state.

The pair of carbon rods 31 are connected to a power supply (not shown). When the pair of carbon electrodes 30 are impressed with a voltage of about 200 V, electric discharges occur among the light emitting heaters 40 within the heating chamber 10.

Figure 5:
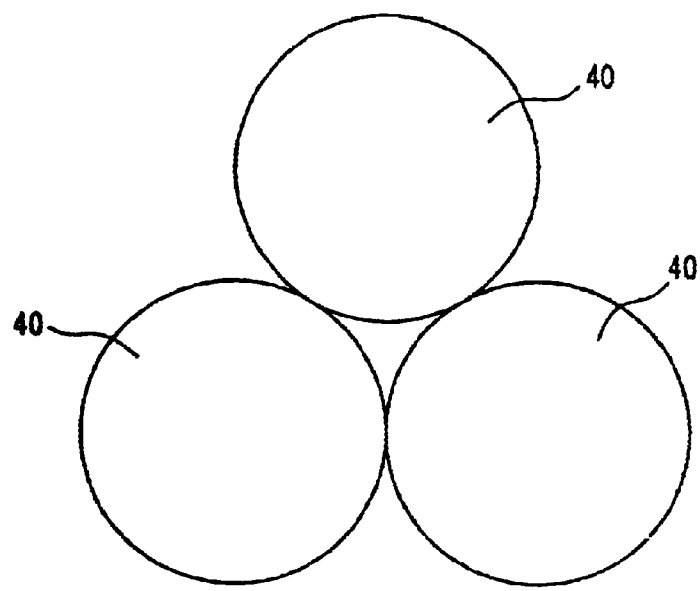
FIG. 5(a) shows these light emitting heaters and FIG. 5(b) schematically illustrates electric discharge between light emitting heaters.
Figure 5:
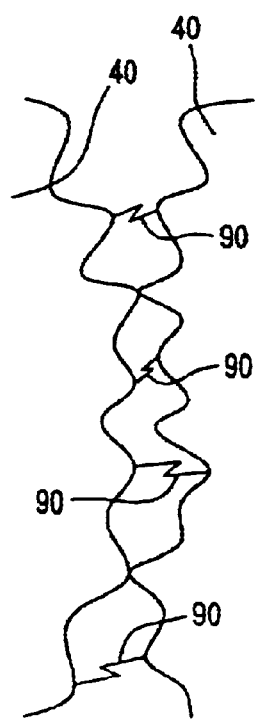

The mechanism of the electric discharges will be described with reference to FIGS. 5(a) and 5(b). FIG. 5(a) shows three light emitting heaters 40 placed in contact, one with another. FIG. 5(b) illustrates the contact portions between two of the elements 40 in an enlarged view.

Since the light emitting heaters 40 are in the shape of a sphere, adjacent ones are in point contact with each other. Each heater 40 has a microscopically rugged surface. Thus, adjacent heaters 40 have microscopic convexities in contact with each other and concavities between the convexities on this surfaces. When a voltage is applied across the adjacent heaters 40, electric currents flow through points at which two heaters 40 are in contact. However, the contact points are small and large currents cannot flow through the contact points, and electric discharges 90 occur across the concavities in the surfaces of the adjacent heaters. When the heaters 40 are in line/surface contact, one with another providing large contact areas, large currents would flow through the areas and the discharge efficiency is reduced.

Electric discharges also occur between the heaters 40 and the heat resistant pipe 22.

If electric discharges occur in a stabilized manner, the voltage can be reduced to about 30 V (a related current is 300–400 A).

Light emission will occur along with the electric discharge. It is considered to be effective for enhancing the thermal decomposition of harmful substances. Especially, in thermal decomposition of dioxin, the enhancement is considered to be large.

The electric discharges occur at about 3000° C. and the heating chamber 10 is heated to a temperature of about 3000° C. in a short time, on the order of tens of seconds after applying the voltage across the electrodes. Since electric discharges also occur between the light emitting heaters 40 and the heat resistant pipe 22, the heat resistant pipe 22 is heated to a temperature of about 3000° C. Thus, the exhaust gas introduced into the heat resistant pipe 22 is heated to a temperature exceeding 2000° C. The incinerator exhaust gas enters the furnace 1 at a temperature between about 1600° C. and about 2000° C. The applied voltage is adjusted to achieve the desired temperature.

When a chimney (not shown) for an incinerator is connected to the inlet port 20, the exhaust gas discharged from the incinerator is introduced into the heat resistant pipe 22. Since the blower 51 draws the exhaust gas into the pipe 22, the exhaust gas neither flows in the reverse direction nor stays within the pipe 22. Since the exhaust gas introduced into the pipe 22 is exposed to a temperature exceeding 2000° C., the soot, dust, carbon monoxide, chlorine compounds, nitrogen compounds and dioxin contained in the exhaust gas are thermally decomposed to harmless gases without burning.

The decomposed gases can contain harmless low molecular weight substances as well as hydrocarbons and heavy metals, and are adsorbed by the active carbon filter 50. Thus, they are not discharged out of the outlet port 21 of the furnace 1. Any small amount of harmful substances remaining are adsorbed by the filter 50. Thus, no harmful gas is discharged out of the outlet port 21 of the furnace 1.

The filter 50 can be regenerated by spraying with water vapor of 120–200° C. Thus, the filter is excellent both for and prevention of secondary pollution. When the filter 50 reaches a designated loading of heavy metals, the filter 50 is replaced. The heavy metals may be recovered by methods such as grinding and sifting according to the specific gravity.

As long as the object of the present invention is achieved, the positions of the inlet port 20, outlet port 21, and blower 51 in the furnace 1 are not limited to those of the present embodiment. For example, while the blower 51 is illustrated as being attached within the outlet port 21 in the present embodiment, it may be disposed between the inlet port 20 and the incinerator discharge.

In an alternative, when a large amount of exhaust gas is discharged from the incinerator, a plurality of exhaust gas decomposition furnaces 1 may be attached to the incinerator. In this case, adapters connect the chimney of the incinerator to the inlet ports 20 of the thermal decomposition furnaces 1. A manifold is used to split the exhaust gas from the incinerator and to feed the gas to the thermal decomposition furnaces 1.

While the present embodiment uses a zigzagging heat resistant pipe 22 to obtain sufficient time for heating the exhaust gas, the form of the heat resistant pipe 22 may be designed freely. The design may depend on the types and concentrations of harmful substances contained in the waste gas and the quantity of the exhaust gas to be processed. For example, the pipe 22 may form a straight line. In the present embodiment the heat resistant pipe 22 is illustrated as extending vertically, but may extend horizontally. In that case, the number of light emitting heaters 40 to be used and electric power consumption are reduced, advantageously.

Figure 6:
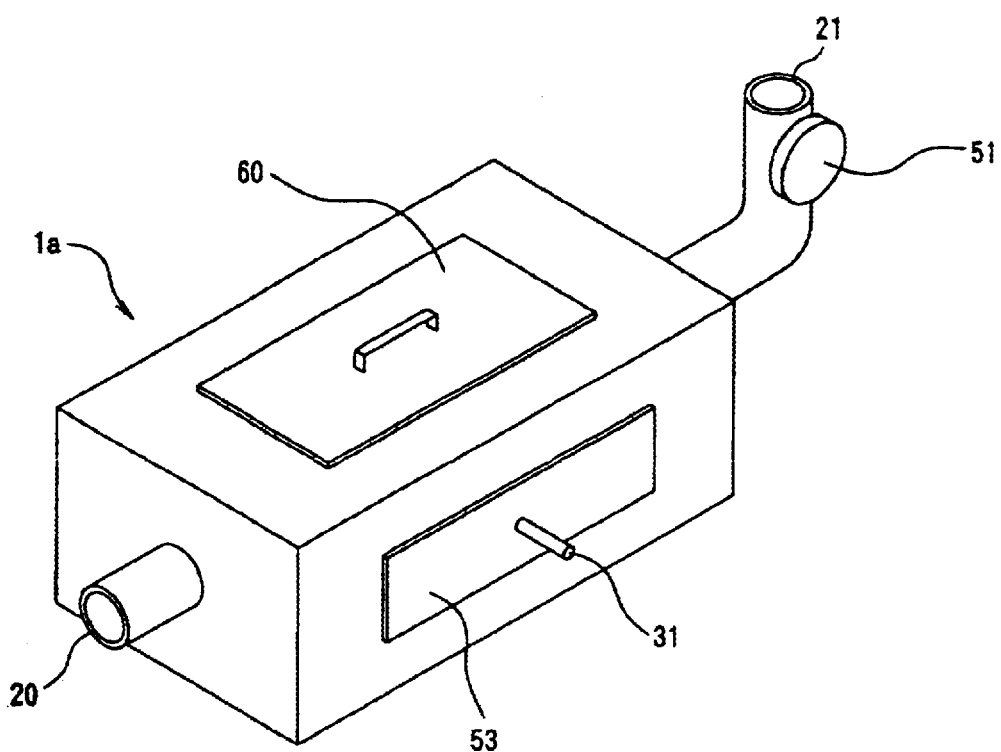
FIG. 6 is a perspective view of a modification of the first embodiment.
Figure 7A:
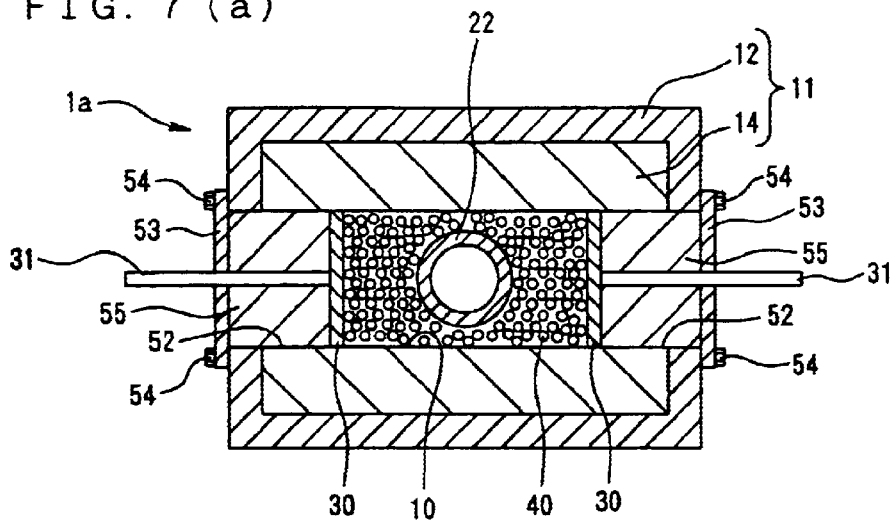
FIGS. 7(a) and 7(b) are vertical and horizontal cross-sectional views of the modification of the first embodiment.
Figure 7B:
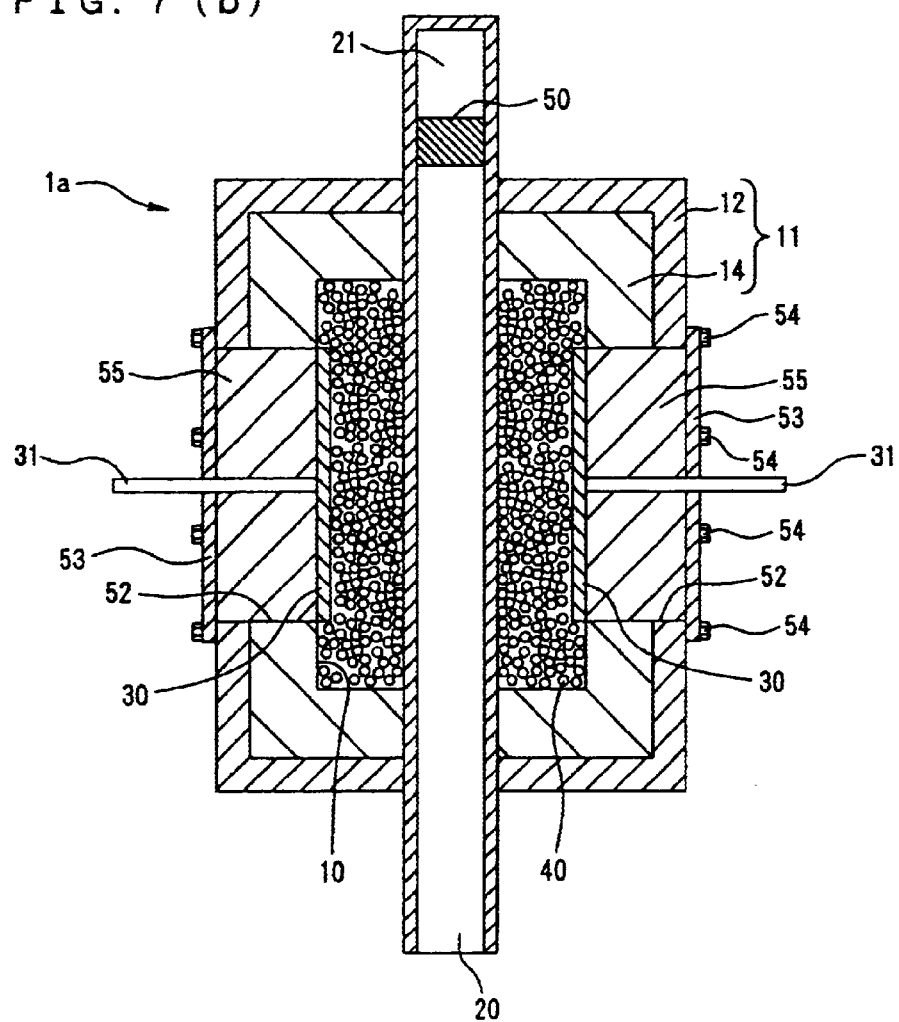

A modification of the first embodiment is shown in FIGS. 6 and 7. FIG. 6 is a perspective view of a thermal decomposition furnace 1a for exhaust gas as the modification. FIGS. 7(a) and 7(b) are vertical and horizontal cross-sectional views, respectively, of the thermal decomposition furnace 1a.

Figure 8:
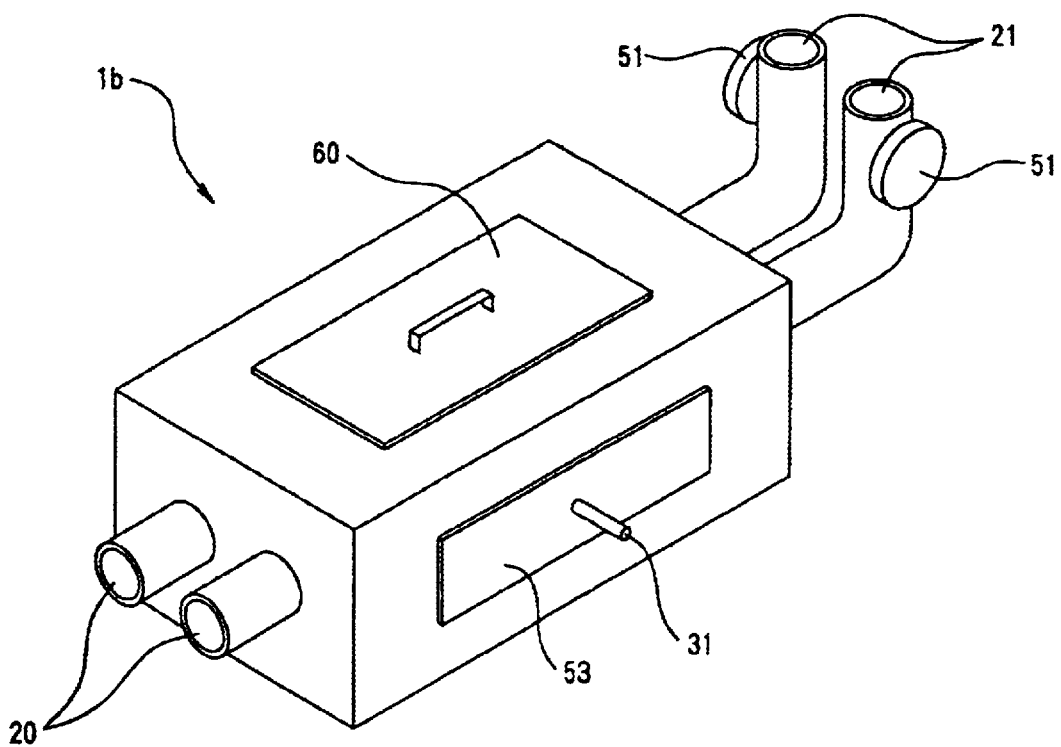
FIG. 8 is a perspective view of a further modification of the first embodiment.

In this modification, the heat resistant pipe 22 takes the form of a horizontal straight line. In this alternative, as shown in FIG. 8, the single thermal decomposition furnace for exhaust gas may have a plurality of heat resistant pipes 22, inlet ports 20, and outlet ports 21 to provide a compact structure and a high exhaust gas decomposition efficiency.

Figure 9A:
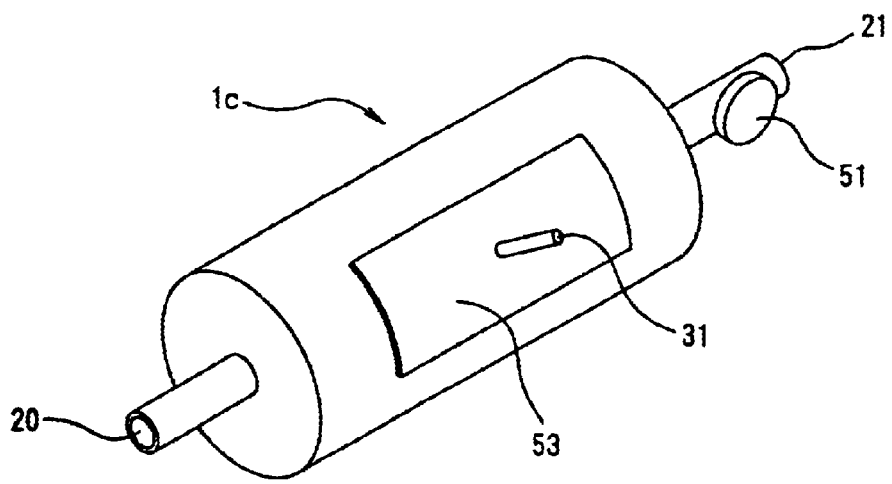
FIGS. 9(a) and 9(b) are a perspective view and a cross-sectional view of a still further modification of the first embodiment.
Figure 9B:
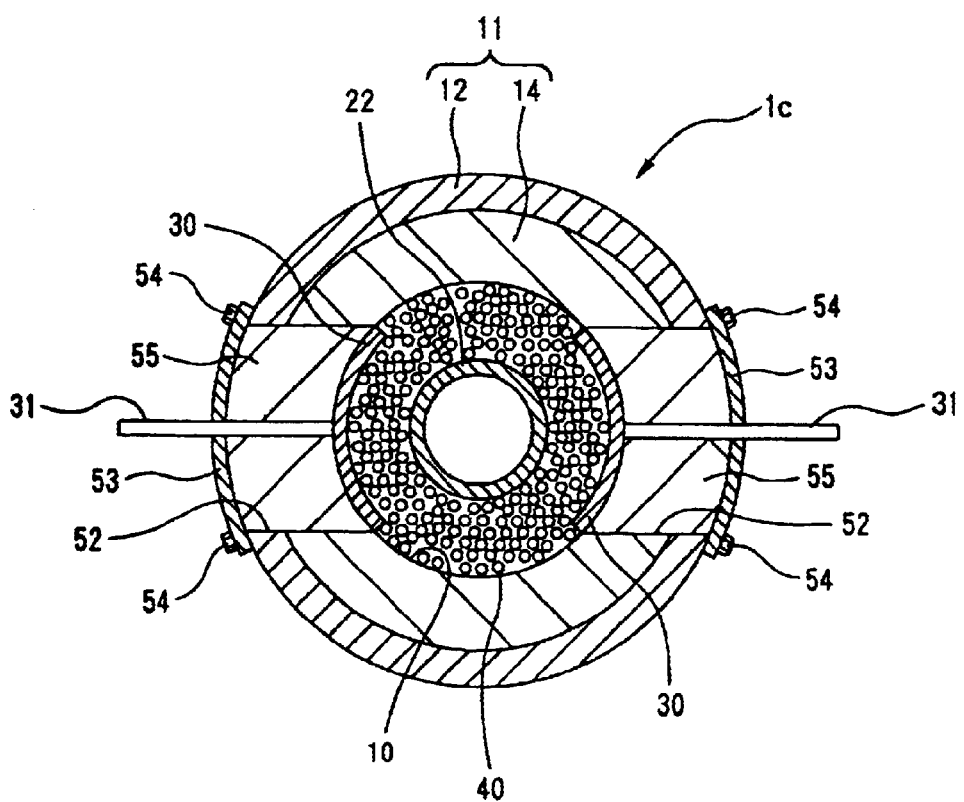

Another modification of the furnace is shown by reference numeral 1c in FIGS. 9(a) and 9(b). FIGS. 9(a) and 9(b) are perspective and vertical cross-sectional views, respectively, of the furnace 1c.

In this modification, the heat resistant pipe 22 takes the form of a horizontal straight line, the thermal decomposition furnace 1c takes the form of a cylinder, and the plurality of light emitting heaters 40 uniformly surround the heat resistant pipe 22.

Figure 10:
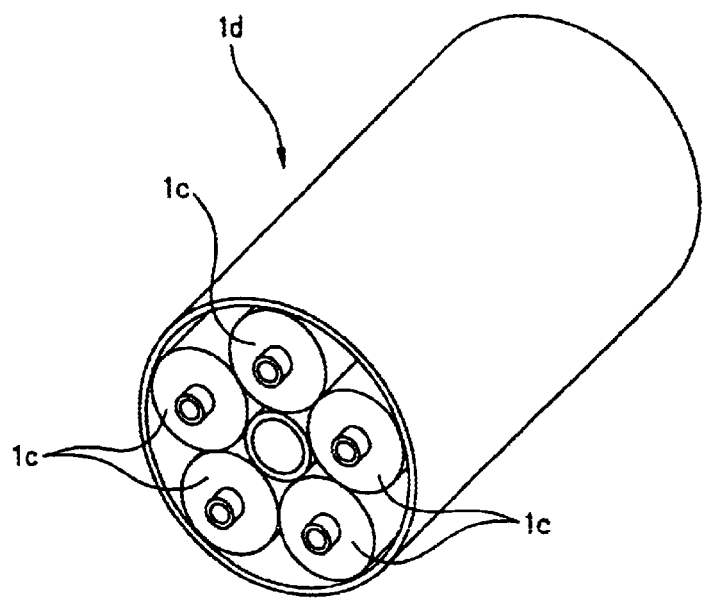
FIG. 10 is a perspective view of the still further modification of the first embodiment.

Thus, as shown in FIG. 10, a plurality of (5 in FIG. 10) thermal decomposition furnaces 1c can be enclosed within a large cylinder and then attached to an incinerator. The resulting thermal decomposition furnace 1d for exhaust gas has a high decomposition efficiency and a compact structure. A central pipe shown within the furnace 1d of FIG. 10 is for guiding a plurality of wires for supplying electric power to the respective decomposition furnaces 1c.

Inspection openings 60 are provided on an upper surface of each modification of the decomposition furnaces 1a, 1b and 1c for inspection of the light emitting heaters 40 and refractory firebrick layer 14 therein and for providing access to replace the light emitting heaters 40 with new light emitting heaters 40. In the case of the decomposition furnace 1c, an opening 52 also functions as an inspection opening 60 of the decomposition furnace 1.

Second Embodiment

Figure 11:
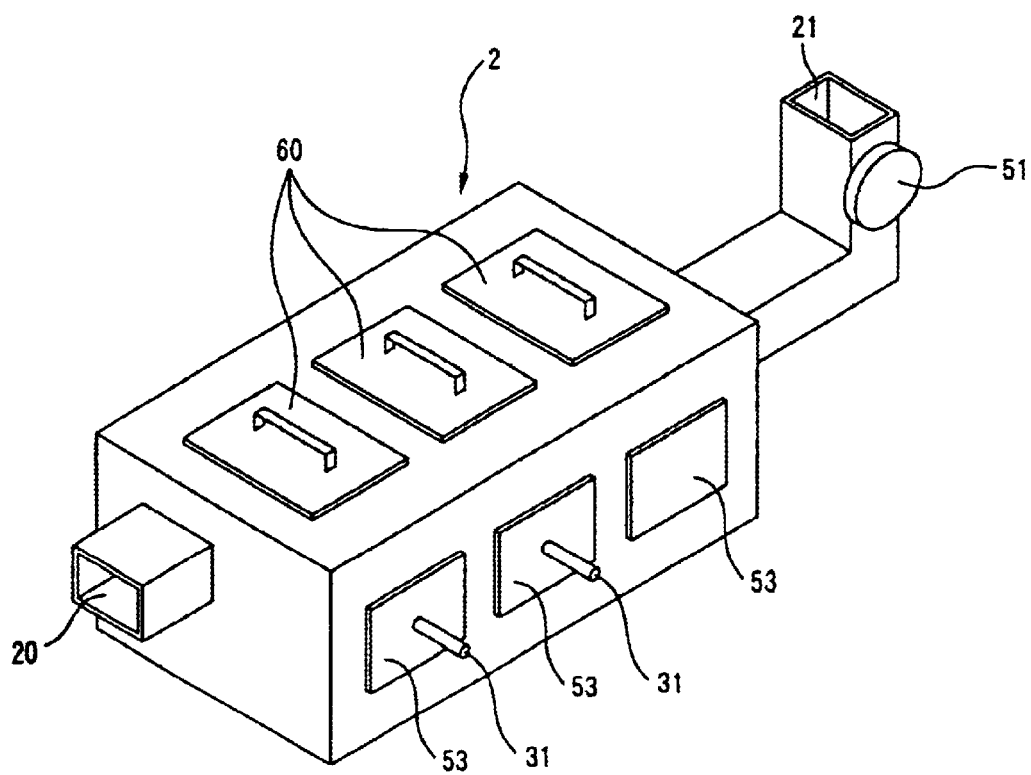
FIG. 11 is a perspective view of a second embodiment of the thermal composition furnace for exhaust gas according to the present invention.
Figure 12:
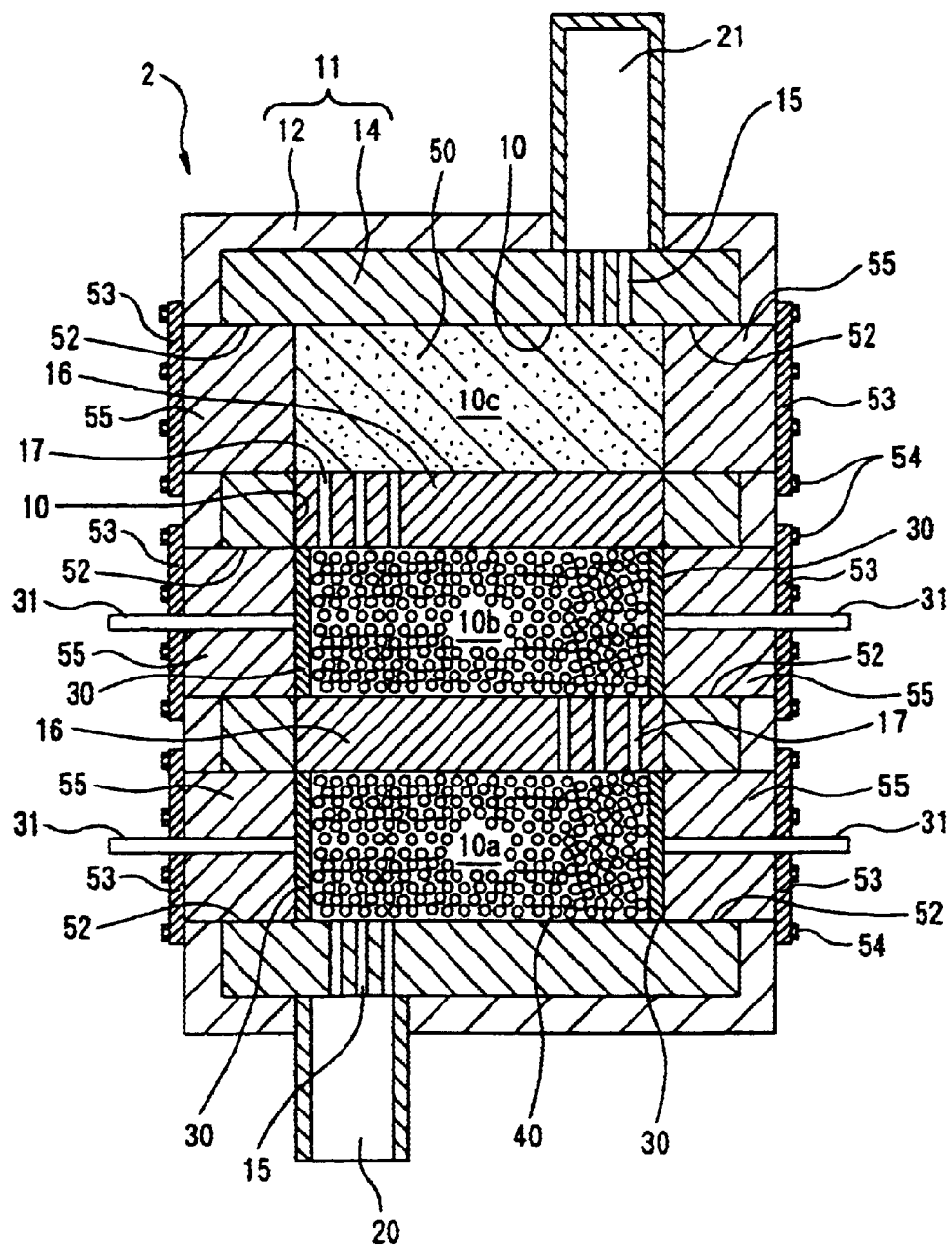
FIG. 12 is a horizontal cross-sectional view of the second embodiment.

FIG. 11 is a perspective view of a thermal decomposition furnace 2 for exhaust gas as a second embodiment. FIG. 12 is a horizontal cross-sectional view of the furnace 2. In FIGS. 11 and 12, the same reference numeral as that used in FIGS. 1–5 is used to denote the same element as, or a one corresponding to, that of the first embodiment.

Further explanation of an element of the second embodiment similar to that of the waste gas decomposition furnace 1 of the first embodiment will be omitted, and only elements of the second embodiment different from those of the first embodiment will be explained next.

The exhaust gas thermal decomposition furnace 2, includes an internal heating chamber 10, has an inlet port 20 on the front side for introducing the exhaust gas into the heating chamber 10, and an outlet port 21 on the rear side for discharging the thermally decomposed exhaust gases out of the heating chamber 10.

The furnace 2 has an outer wall 11 which has a doubled structure similar to that of the first embodiment. The space surrounded by the innermost firebrick layer 14 forms the heating chamber 10. The inlet and the outlet ports 20 and 21 are in fluid communication with the heating chamber 10 through corresponding holes 15 provided in the front and rear firebrick layer 14 such that the exhaust gas flows from the inlet port 20 to the outlet port 21.

The heating chamber 10 is divided by a plurality of (2 in FIG. 12) partitions 16 into a plurality of (three in FIG. 12) subchambers 10a, 10b, 10c arranged in the direction of flow of the exhaust gas such that the foremost subchamber 10a is in fluid communication with the inlet port 20 and the rearmost subchamber 10 fluid communicates with the outlet port 21.

The plurality of partitions 16 have a corresponding plurality of holes 17 provided in alternately right and left side portions thereof such that each group of holes places adjacent subchambers in fluid communication. In such an arrangement, an exhaust gas path extends within the heating chamber 10 in a zigzag manner from the foremost subchamber 10a through a plurality of holes 17 to a central subchamber 10b and a plurality of holes 17 to a rearmost subchamber 10c. Thus, the exhaust gas introduced through inlet port 20 into the furnace passes through the respective subchambers 10a, 10b and 10c in a zigzag manner and is then discharged out the outlet port 21.

A pair of plate-like carbon electrodes 30 are disposed on the respective right and left sides of each of the subchambers 10a and 10b with a pair of carbon rods 31 each extending outward from a respective carbon electrode 30 through the corresponding outer wall 11.

The rearmost subchamber 10c is filled with a fiber-like active carbon filter 50 whereas each of the subchambers 10a and 10b is filled with light emitting heaters 40 as in the first embodiment.

The size and shape of the through holes 15 and 17 provided in the firebrick layers 14 and the partitions 16 are not limited as long as the light emitting heaters 40 are prevented from passing therethrough. When the light emitting heaters 40 each take the form of a sphere, the holes 15 and 17 preferably take the form of a triangle in cross section. The holes 15 and 17 may take the form of a horizontal or vertical slit in cross section. In an alternative, each slit-like hole 17 may be formed by arranging ceramic pillars in parallel instead of using the partitions 16 with a plurality of holes 17. In this case, the opening areas of the holes 15 and 17 increase and hence are preferable when a large amount of exhaust gas flows through the holes.

Inspection openings 60 are provided on an upper surface of the furnace 2 to enable inspection of the light emitting heaters 40 and firebrick layers 14, and to enable replacement of the old light emitting heaters 40 with new ones.

A method of thermally decomposing harmful substances contained in the exhaust gas using the thermal decomposition furnace 2. A voltage is applied across the respective pairs of carbon electrodes 30 to produce electric discharges among the light emitting heaters 40. In this alternative, the pairs of carbon electrodes 30 are connected in series to a power supply (not shown). Although they may be connected in parallel, the series connection produces a higher discharge efficiency to thereby provide a higher temperature, which is preferable.

When a chimney of an incinerator (not shown) is connected to the inlet port 20 and is in fluid communication, the exhaust gas produced by the incinerator is introduced into the heating chamber 10. Since the blower 51 draws the exhaust gas into the heating chamber 10, the exhaust gas neither flows in the reverse direction nor stays within the heating chamber 10. When the exhaust gas is introduced into the heating chamber 10, no oxygen is present within the heating chamber 10 and the light emitting heaters 40 filled with the heating chamber 10 are placed in an oxygenless environment.

The introduced exhaust gas contacts the electric discharges at about 3000° C. produced among the light emitting heaters 40 to be heated to that temperature, harmful substances such as soot, dust, carbon monoxide, chlorine compounds, nitrogen compounds and dioxins contained in the exhaust gas are thermally decomposed without being burned to harmless gases.

In this embodiment, the positions of the inlet port 20, outlet port 21, inspection openings 60, and blower 51 in the furnace 2 are not limited to the present embodiment as long as the object of the present invention is achieved.

When the incinerator discharges a large amount of exhaust gas, a plurality of thermal decomposition furnaces 2 may be attached to the incinerator.

The form of the path for the exhaust gas may be freely designed the number of subchambers, and the quantity of the light emitting heaters 40 may be adjusted, depending on the types and concentrations of harmful substances contained in the exhaust gas and the quantity of the exhaust gas to be decomposed. While in the present embodiment the flow path is illustrated as extending horizontally, it may also extend vertically.

Third Embodiment

Figure 13:
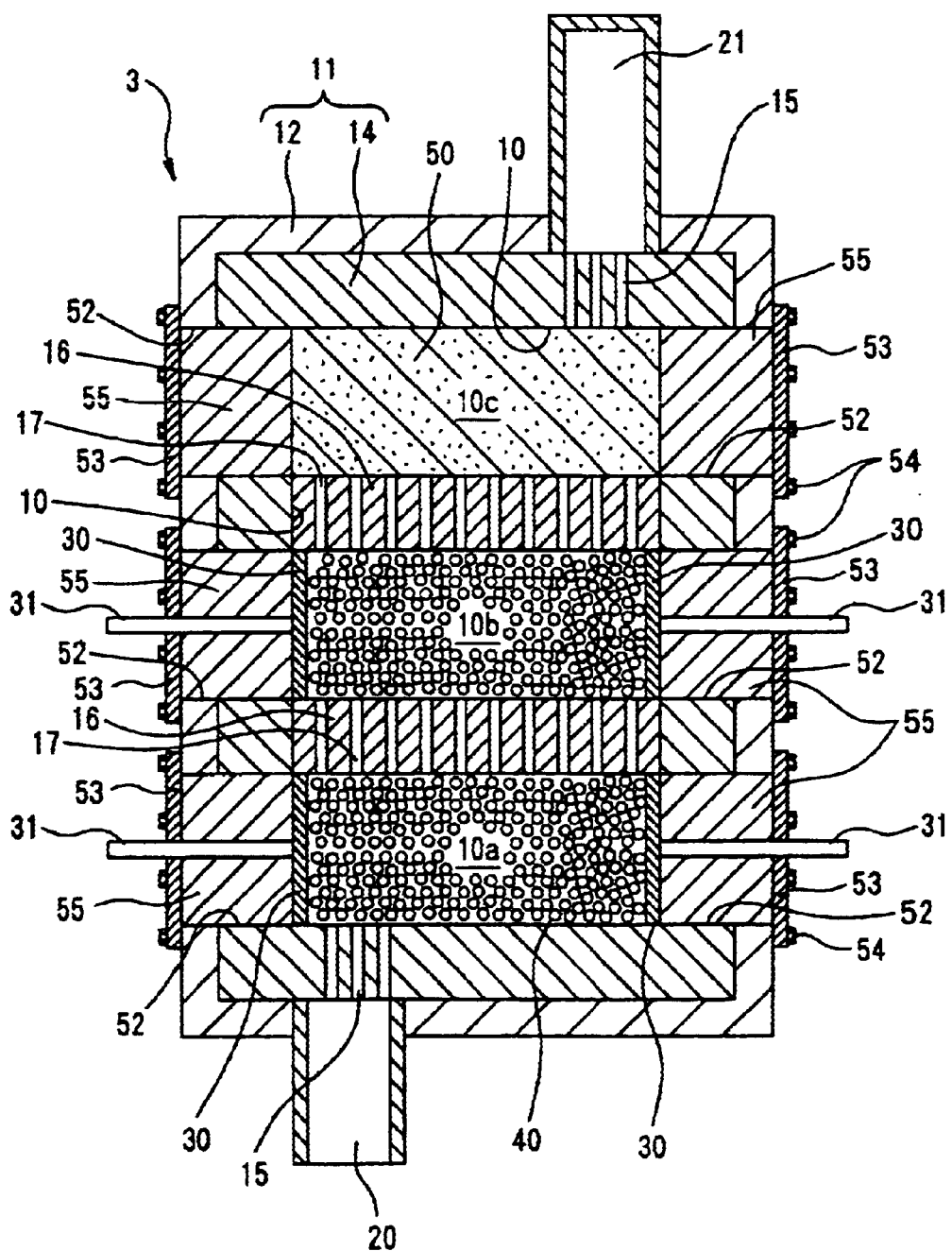
FIG. 13 is a horizontal cross-sectional view of a third embodiment of the thermal composition furnace for exhaust gas according to the present invention.

FIG. 13 is a horizontal cross-sectional view of an exhaust gas thermal decomposition furnace 3 of a third embodiment, which is similar in appearance to the decomposition furnace 2 of the second embodiment and will be described with reference to FIG. 11.

The furnace 3 of the third embodiment is substantially the same as the furnace 2 of the second embodiment except for the internal composition of the heating chamber 10 thereof.

The heating chamber 10 is divided by a plurality (2 in FIG. 13) of partitions 16 of a heat resistant firebrick into a plurality of (3 in FIG. 13) subchambers 10a, 10b and 10c arranged longitudinally in the furnace 3. An inlet port 20 is in fluid communication with the foremost subchamber 10a while an outlet port 21 is in fluid communication with the rearmost subchamber 10c.

Each partition 16 has a plurality of holes 17 uniformly distributed thereon to thereby place adjacent subchambers in fluid communication. In such an arrangement, substantially straight exhaust gas flow paths are formed within the heating chamber 10 such that the exhaust gas entering the inlet port 20 passes substantially straight from the foremost subchamber 10a, through a plurality of holes 17, the central subchamber 10b, a plurality of holes 17 to the rearmost subchamber 10c and thence discharged out of the outlet port 21. The plurality of holes 17 are provided uniformly in substantially the entire partitions 16 to increase a flow of the exhaust gas.

A method of thermally decomposing the harmful substances contained in the exhaust gas, using the furnace 3 in this embodiment, is similar to that used in the second embodiment except that the exhaust gas passes substantially straight through the heating chamber 10, and further description thereof will be omitted.

In this embodiment, the positions of the inlet port 20, outlet port 21, inspection openings 60 and blower 51 in the furnace 3 are not limited to the present embodiment as long as the object of the present invention is achieved.

When the incinerator discharges a large amount of exhaust gas, a plurality of thermal decomposition furnaces 3 may be attached to the incinerator.

The form of the path (straightforward or zigzag) for the exhaust gas may be freely designed, the number of subchambers filled with a plurality of light emitting heaters, and the quantity of the light emitting heaters 40 may be adjusted, depending on the kinds and concentrations of harmful substances contained in the exhaust gas and the quantity of the exhaust gas to be decomposed. While in the present embodiment the flow path is illustrated as extending horizontally, it may also extend vertically.

Fourth Embodiment

Figure 14:
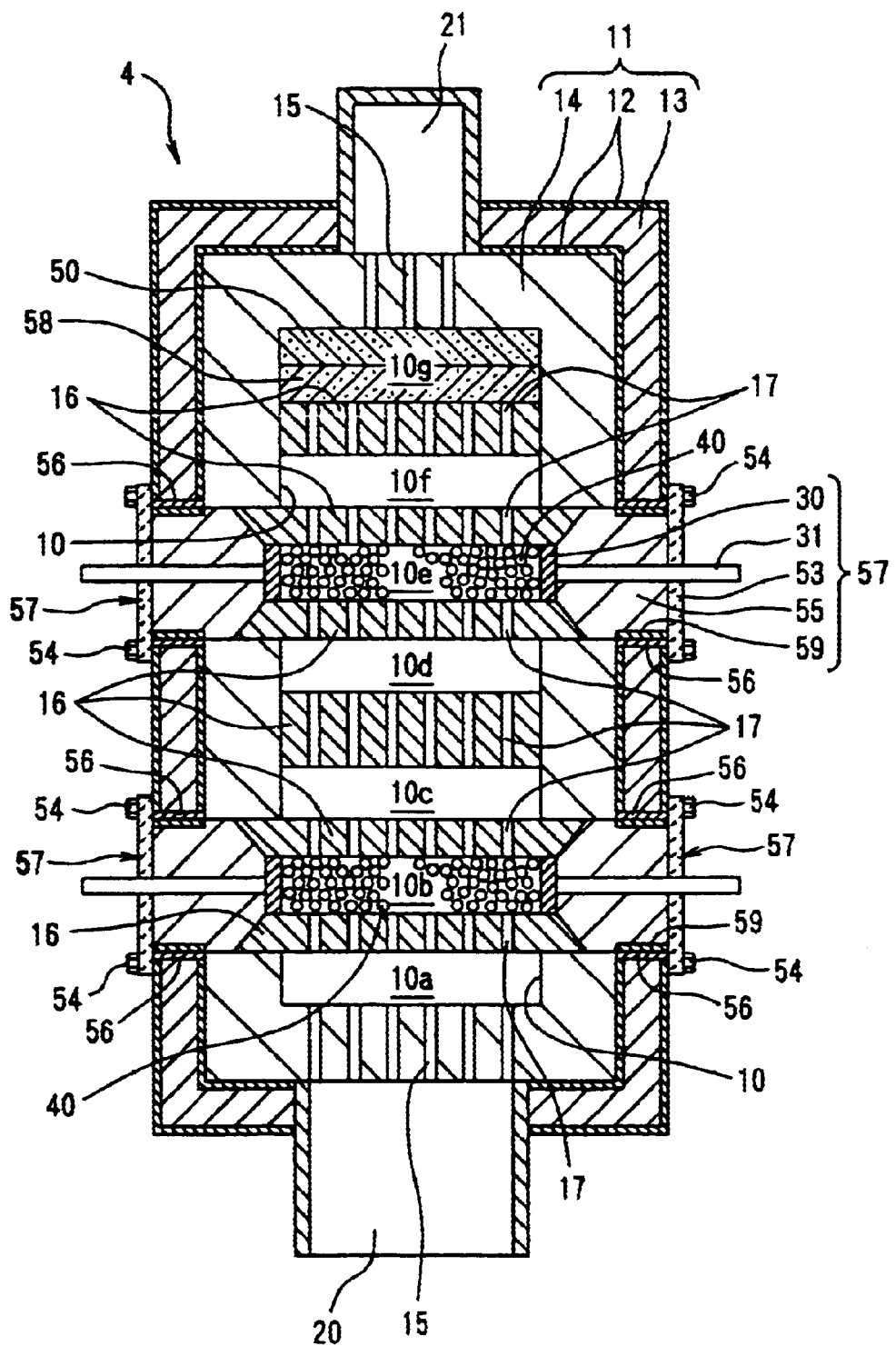
FIG. 14 is a horizontal cross-sectional view of a fourth embodiment of the thermal composition furnace for exhaust gas according to the present invention.

FIG. 14 is a horizontal cross-sectional view of an exhaust gas thermal decomposition furnace 4 of a fourth embodiment.

The furnace 4 of the fourth embodiment is substantially the same as the furnace 3 of the third embodiment except for the composition of the outer wall 11, pairs of carbon electrodes 30, and openings 52 thereof.

The furnace 4 has an outer wall 11 having a 4-layered structure which includes the innermost heat-resisting firebrick layer 14, an inner iron plate layer 12, an outer refractory concrete layer 13, and the outermost iron plate layer 12 coated with a heat resistant coating.

The heating chamber 10 is separated by a plurality (6 in FIG. 14) of partitions 16 of a heat resistant firebrick dividing the chamber into a plurality of (7 in FIG. 14) subchambers 10a–10g arranged longitudinally in the furnace 4. An inlet port 20 is in fluid communication with the foremost subchamber 10a while an outlet port 21 is in fluid communication with the rearmost subchamber 10g.

Each partition 16 has a plurality of holes 17 uniformly distributed thereon to place adjacent subchambers in fluid communication. In such arrangement, substantially straight exhaust gas flow paths are formed within the heating chamber 10 such that the exhaust gas entering the inlet port 20 passes substantially straight from the foremost subchamber 10a, through the plurality of holes 17, the subchamber 10b, the second plurality of holes 17, . . . , to the rearmost subchamber 10g and then discharged out of the outlet port 21.

A pair of plate-like carbon electrodes 30 are disposed on a respective right and left sides of each of selected subchambers (the second and fifth chambers 10b and 10e from the front in FIG. 14) except for the rearmost subchamber 10g. Each electrode 30 has a carbon rod 31 which extends outwards through the outer wall 11 of the furnace 4. Each subchamber with a pair of carbon electrodes 30 is filled with light emitting heaters 40 as in the first embodiment.

The rearmost subchamber 10g is filled with a fiber-like active carbon filter 50 and a Japanese Bincho carbon layer 58 to adsorb hydrocarbons and heavy metals. In an alternative, a particulate active carbon filter may be used.

As described above, in the first-third embodiments, each opening 52 is covered with a corresponding iron cover 53, and a refractory concrete block 55 is filled between the iron cover 53 and a corresponding carbon electrode 30. The cover 53, refractory concrete block 55, and the combination of the electrode 30 and carbon rod 31 are an independently removable unit 57.

In the present embodiment the four members, i.e., cover 53, refractory concrete block 55, carbon electrode 30 and carbon rod 31 form an electrode unit 57 where the cover 53 is made of ceramic or may be an iron plate coated with an insulator. Thus, the cover 53, refractory concrete layer 55, electrode 30 and carbon rod 31 are not required to be removed individually to replace the carbon electrode 30. Instead, the electrode unit 57 is replaced wholly with another one to facilitate replacing the carbon electrode 30 with a new carbon electrode 30.

An outer rectangular iron frame 56 is provided so as to fit fixedly into an inner edge of each opening 52. A corresponding inner rectangular iron frame 59 is received within the corresponding rectangular iron cylindrical frame 56. The corresponding rectangular iron cylindrical frame 56 fits fixedly over a corresponding end portion of the refractory concrete block 13 such that the iron frame 59 slides along with the electrode unit 57 relative to the frame 56 to move the electrode unit 57 into/out of the opening 52.

Each carbon electrode 30 does not extend into the heating chamber 10, but ends at a wall of the heating chamber 10. Thus, the carbon electrode 30 does not deteriorate from harmful substances contained in the exhaust gas and/or at the furnace temperature.

A method of thermal decomposition of the harmful substances 10 contained in the exhaust gas, using the furnace 4 of this embodiment, is similar to that used in the second embodiment, except the exhaust gas passes in a substantially straight path through the heating chamber 10.

When the incinerator discharges a large amount of exhaust gas, a plurality of thermal decomposition furnaces 4 may be attached to the incinerator.

The form of the path (substantially straight or zigzag) for the exhaust gas may be freely designed. The number of subchambers, each filled with a plurality of light emitting heaters, and the quantity of light emitting heaters may be adjusted, depending on the kinds and concentrations of the harmful substances contained in the exhaust gas and the quantity of the exhaust gas to be decomposed. While in the present embodiment the flow path is illustrated as extending horizontally, it may also extend vertically.

A method of making the spherical light emitting heaters 40 of graphite used in the first through fourth embodiments and their physical properties will be described in detail next.

Example 1

A filler of phenol resin or polydivinyl benzene resin was mixed with acrylic fibers, animal or plant fibers having a length of 0.1–0.5 mm. The mixture then filled a mold, and sufficient pressure and heat were applied to the mixture to harden into spheres, hemispheres, rectangular parallelepipeds or cylinders. In the case of hemispheres, two hemispheres were united to form a sphere. The moldings were then heated to 250–300° C. for flame resistance under an inert gas, and then carbonized at 1000–1500° C. They were then graphitized at 2000–3000° C., and sized for surface treatment.

In the carbonizing and graphtizing processes, a pressure of not less than 300 kg/cm$^2$ was applied isotopically to the moldings in hot isostatic pressing (HIP) while repeatedly burning the moldings under the inert gas to increase the density of the graphite. In HIP, pressure is applied isotropically to even the spheres. Generally, graphite and carbon substances have many pores with a total area of generally about 25% of the whole surface. However, the total area of the pores present in the surface of graphite was reduced to not more than 10% of the whole surface area and according to circumstances, to not more than 5%, in the above process.

The use of resin as the filler produced a graphite with a relatively small number of pores. Burning the moldings under pressure, produced a graphite of low permeability. Such graphite exhibited corrosion resistance to almost all chemicals in a wide range of temperatures. Such graphite had very high thermal conductivity, and high thermal stability such that it was not adversely affected by a rapid change in its temperature as compared to general materials having a similar corrosion resistance.

When the impermeable graphite was shaped as a rectangular parallelepiped or a cylinder, the shape was ground to spheres for use as light emitting heaters.

The light emitting heaters were made of impermeable graphite, so that they had a gas absorptivity of not higher than that of rubber, a strength of 2–3 times that of general graphite, a hardness of not less than 65 (in this example, 68), and a density of not less than 1.87 g/cm$^3$ (adjustable depending on a mixture ratio of fibers). They further had a tensile strength of 170 kg/cm$^2$, a bending strength of 360 kg/cm$^2$, a compressive strength of 1000 kg/cm$^2$, a modules of elasticity of not less than 1300 kg/mm$^2$, a coefficient of thermal expansion of $3.0 \times 10^{-6}$/° C., a thermal conductivity of 130 Kcal/m·h·° C., and a thermal resistance of 3000° C. The light emitting heaters exhibited an excellent corrosion resistance to chemicals having strong acidity such as a concentrated sulfuric acid or a nitric acid, and chemicals having strong alkalinity such as a solution of sodium hydroxide. When the graphite was made from a phenol resin, its resistance to alkalinity was somewhat reduced. Results of tests in corrosion resistance are shown in Tables 1–3 below. In the respective Tables, the term "all" described in a concentration item represents "all concentrations".

Since the light emitting heaters were each made of the impermeable graphite, as described above, they had the following excellent properties:

(1) There was low oxidation deterioration from harmful substances contained in the exhaust gas;

(2) There was low oxidation with oxygen contained in the exhaust gas or oxygen produced by decomposition of the exhaust gas, and very low deterioration. There was very little production of carbon monoxide or carbon dioxide;

(3) There was high strength, low erosion, and excellent durability; and (4) There were few pores and very low adsorption of harmful substances in the pores. There was very little gas adsorbed and very little gas desorbed at high temperatures.

TABLE 1

| Chemicals' Name | Concentration (% by weight) | Temperature (° C.) | Corrosion[1] Resistance |
|---|---|---|---|
| [acid] | | | |
| hydrochloric acid | All | boiling point | A |
| nitric acid | 10~40 | 60 | B |
| hydrofluoric acid | 48 | boiling point | A |
| hydrofluoric acid | 48~60 | 90 | A |
| sulfuric acid | 25~75 | 130 | A |
| phosphoric acid | 85 | boiling point | A |
| phosphoric acid | 96 | 100 | A |
| chromic acid | 10 | 93 | B |
| acetic acid | all | boiling point | A |
| oxalic acid | all | boiling point | A |
| sulfurous acid (sulfurous acid gas saturated) | — | room temperature | A |
| hydrochloric acid (chlorine gas staturated) | 20 | boiling point | A |
| hydrofluoric acid + nitric acid | 5/15 | 93 | A |

[1]A: no corrosion, and B: slight corrosion.

TABLE 2

| Chemicals' Name | Concentration (% by weight) | Temperature (° C.) | Corrosion[1] Resistance |
|---|---|---|---|
| [alkali] | | | |
| rayon spinning solution | — | boiling point | A |
| caustic soda aqueous solution | 67 | boiling point | A |
| caustic soda aqueous solution | 67~80 | 125 | A |
| [salt aqueous solution] | | | |
| zinc chloride | All | boiling point | A |
| iron chloride | All | 100 | A |
| sodium chloride | All | boiling point | A |
| sodium hypochloride | 5 | room temp. | A |
| ammonium persulfate | All | 18 | A |
| copper sulfate | All | boiling point | A |
| [halogen] | | | |
| Chlorine | 100 | 170 | A |
| chlorine water | saturated | room temp. | A |

[1]A: no corrosion B: slight corrosion.

TABLE 3

| Chemicals' Name | Concentration (% by weight) | Temperature (° C.) | Corrosion[1] Resistance |
|---|---|---|---|
| [organic compound] | | | |
| acetone | 100 | boiling point | A |
| ethyl alcohol | 95 | boiling point | A |
| carbon tetrachloride | 100 | boiling point | A |
| ethane tetrachloride | 100 | boiling point | A |
| chloroform | 100 | boiling point | A |
| kerosine | 100 | boiling point | A |
| Dowtherm[2] | 100 | 170 | A |
| benzene | 100 | boiling point | A |
| benzene (saturated with chlorine) | 100 | 60 | A |
| benzyl chloride | 100 | 170 | A |
| methyl alcohol | 100 | boiling point | A |
| monochlorobenzene | 100 | boiling point | A |

[1]A: no corrosion, and B: slight corrosion.
[2]Heat medium manufactured by the Dow Chemical Co.

Example 2

A filler of phenol resin or polydivinyl benzene resin was mixed with at least one of tungsten powder of a purity of at least 99.9% having an average grain size of about 1.0 $\mu$m and titanium powder of a purity of at least 99.9% having an average grain size of about 1.0 $\mu$m.

This mixture may be further mixed with acrylic, animal or plant fibers identical to those used in Example 1, and/or carbon black powder, coke or Japanese Bincho charcoal powder excellent for electrical conductivity.

By processing this mixture in a manner similar to that used in Example 1, light emitting heaters each comprising a graphite sphere of high density and having only a few pores were obtained. It is to be noted that unlike Example 1 the light emitting heaters contained at least one of tungsten and titanium and that in the last step of the graphitization they were subjected to heat treatment at about 3000° C. under an inert gas.

Tungsten was changed by heat treatment at about 3000 to ditungsten monocarbide ($W^2C$) having a formula weight of 379.71, a density of 17.2 g/cm$^3$, a Mohs' hardness of 9, and an electric resistivity of 81 $\mu\Omega$/cm (25° C.)). Titanium was changed to titanium carbide (TiC) having a formula weight of 59.90, a melting point of 3140±90° C., a boiling point of 4300° C., a density of 4.94 g/cm³, and an electric resistibility of 193 $\mu\Omega$/cm (at room temperature)). When ditungsten monocarbide was heated at a temperature of not less than 2400° C., it was crystallized to a stable β type crystal system.

Titanium has a melting point of 1675° C., a boiling point of 3262° C., and a density of 4.54 g/cm³. Titanium carbide had greatly increased melting and boiling points, and also a high density. It is to be noted that tungsten has a melting point of 3387° C. and a melting point of 5962° C.

The light emitting heaters of impermeable graphite containing ditungsten monocarbide and/or titanium carbide had features identical to the features (1)–(4) described in Example 1 as well as corrosion resistance, mechanical strength (high hardness, and a modulus of elasticity of 31600–44800 Kg/mm²), and heat resistance (resistant to a temperature of not less than 3000° C.) excellent compared to the ditungsten monocarbide- and/or titanium carbide-free light emitting heaters of Example 1. It also had an excellent electrical conductivity (its electrical resistance is not more than 70 $\mu\Omega$/cm, in this example, 10 $\mu\Omega$/cm) and a high discharge efficiency.

The heat treatment at about 3000° C. under the inert gas produced the following advantages:

a) After the heat treatment, the light emitting heaters were not required to be subjected to a finishing process or step such as bright heat treatment (for polishing or finishing the light emitting heaters);

b) The light emitting heaters are hardly deformed in use;

c) It does not cause harm to the public.

Example 3

A phenol resin or polydivinyl benzene resin as a binder was mixed with carbon black powder, coke or Japanse Bincho charcoal powder excellent in electric conductivity as a filler. The mixture may further be mixed with at least one of tungsten and titanium powder. By processing this mixture in a manner similar to that in which the mixture in Example 2 was processed, light emitting heaters in the form of a graphite spheres having a high density and only a few pores were obtained.

The light emitting heaters had excellent characteristics similar to those of Example 2.

INDUSTRIAL APPLICABILITY

The present invention provides an inexpensive thermal decomposition furnace for exhaust gas which is attached to equipment or facilities comprising an incinerator which discharges exhaust gas or smoke containing harmful substances to thermally decompose the harmful substances to render the substances harmless.

What is claimed is:

1. A thermal decomposition furnace for exhaust gas containing harmful substances, the furnace comprising:

a heating chamber for heating the exhaust gas;

an inlet port for introducing the exhaust gas into said heating chamber;

at least one pair of electrodes provided within said heating chamber;

a plurality of light emitting heaters which contain carbon as a main ingredient, the plurality of light emitting heaters being provided between said at least one pair of electrodes and configured to produce an electric discharge when a voltage is applied across said at least one pair of electrodes; and an outlet port for discharging thermally decomposed exhaust gas out of said heating chamber;

wherein the thermally decomposed exhaust gas has been rendered substantially harmless.

2. The thermal decomposition furnace according to claim 1, wherein said plurality of light emitting heaters are placed in an oxygenless environment.

3. The thermal decomposition furnace according to claim 1, wherein said plurality of light emitting heaters are placed in a vacuum.

4. The thermal decomposition furnace according to claim 1, further comprising a fluid path provided within said heating chamber and extending between said inlet port and said outlet port for allowing the exhaust gas to pass therethrough, and wherein said plurality of light emitting heaters are provided in at least a part of said fluid path.

5. The thermal decomposition furnace according to claim 1, further comprising a heat resistant pipe provided within said heating chamber to extend between said inlet port and said outlet port for allowing the exhaust gas to pass therethrough, and wherein said plurality of light emitting heaters surround at least a part of said heat resistant pipe.

6. The thermal decomposition furnace according to claim 5, wherein said heat resistant pipe is composed of a material whose main ingredient is carbon.

7. The thermal decomposition furnace according to claim 1, wherein said plurality of light emitting heaters are each comprised of a material selected from the group consisting of charcoal, graphite, and mixtures thereof.

8. The thermal decomposition furnace according to claim 1, wherein each of said plurality of light emitting heaters are impermeable.

9. The thermal decomposition furnace according to claim 1 wherein said plurality of light emitting heaters each take the form of a sphere.

10. The thermal decomposition furnace according to claim 1, further comprising a filter disposed between said heating chamber and said outlet port, wherein the filter is made of a material selected from the group consisting of active carbon, charcoal, and mixtures thereof.

* * * * *